Figure 4:
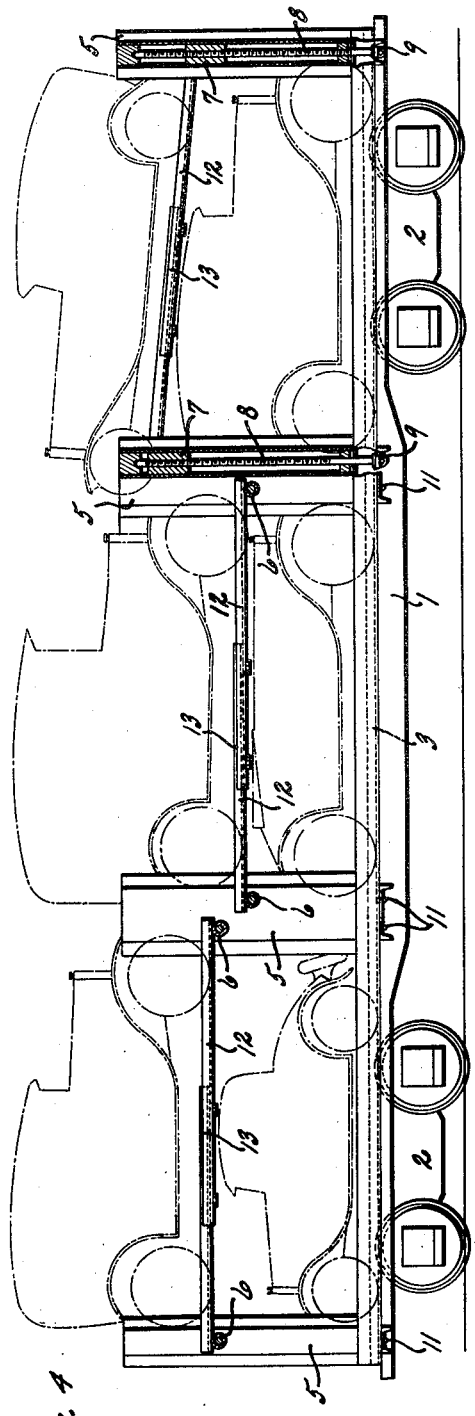

Jan. 17, 1933.                D. J. DOLAN                 1,894,534
                          AUTOMOBILE RAILWAY CAR
                     Filed Oct. 9, 1931      3 Sheets-Sheet 1
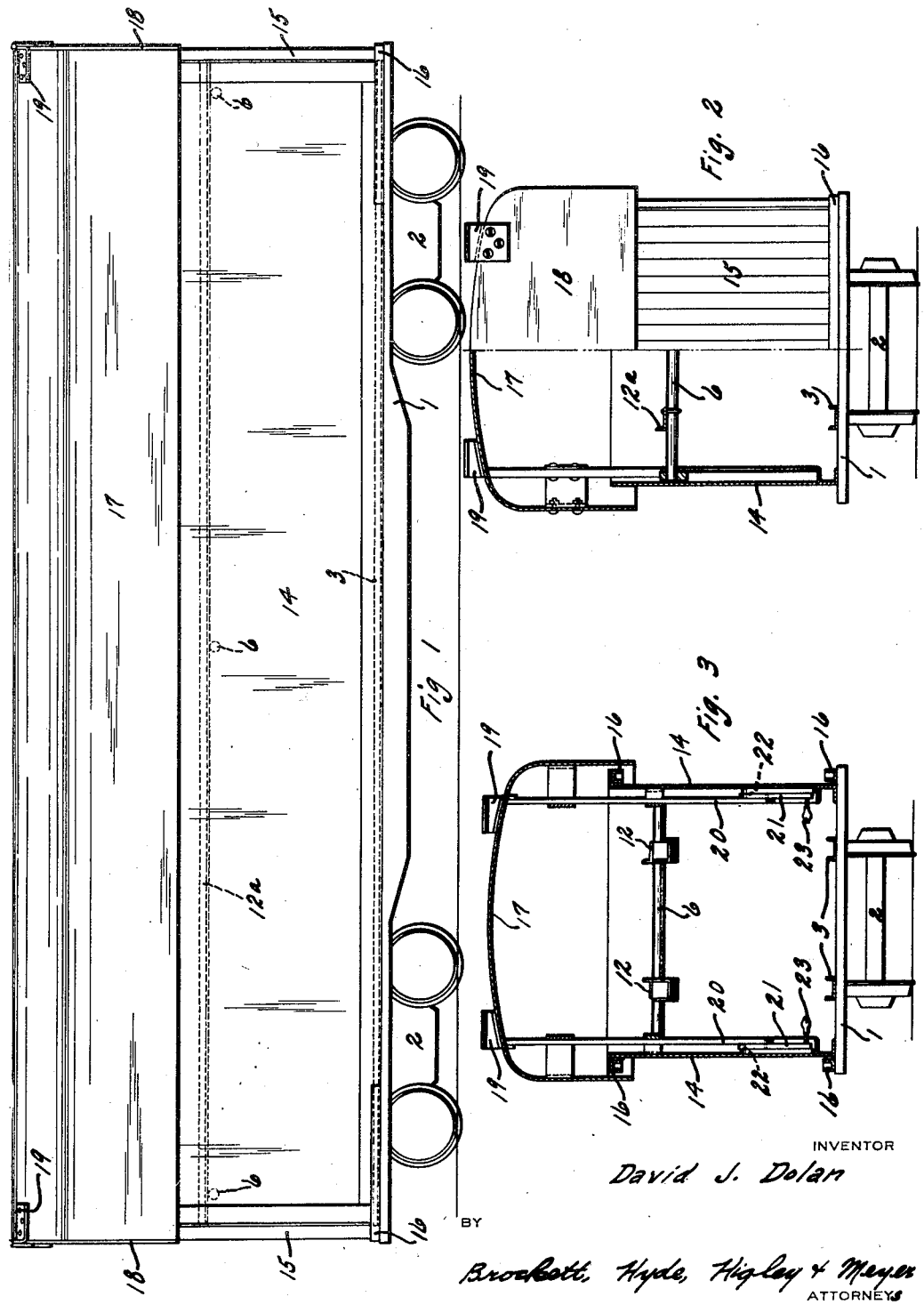
INVENTOR
David J. Dolan
BY
Brockett, Hyde, Higley & Meyer
ATTORNEYS Jan. 17, 1933.  D. J. DOLAN  1,894,534

AUTOMOBILE RAILWAY CAR

Filed Oct. 9, 1931  3 Sheets-Sheet 2

INVENTOR
David J. Dolan

BY
Brockett, Hyde, Higley & Meyer
ATTORNEYS

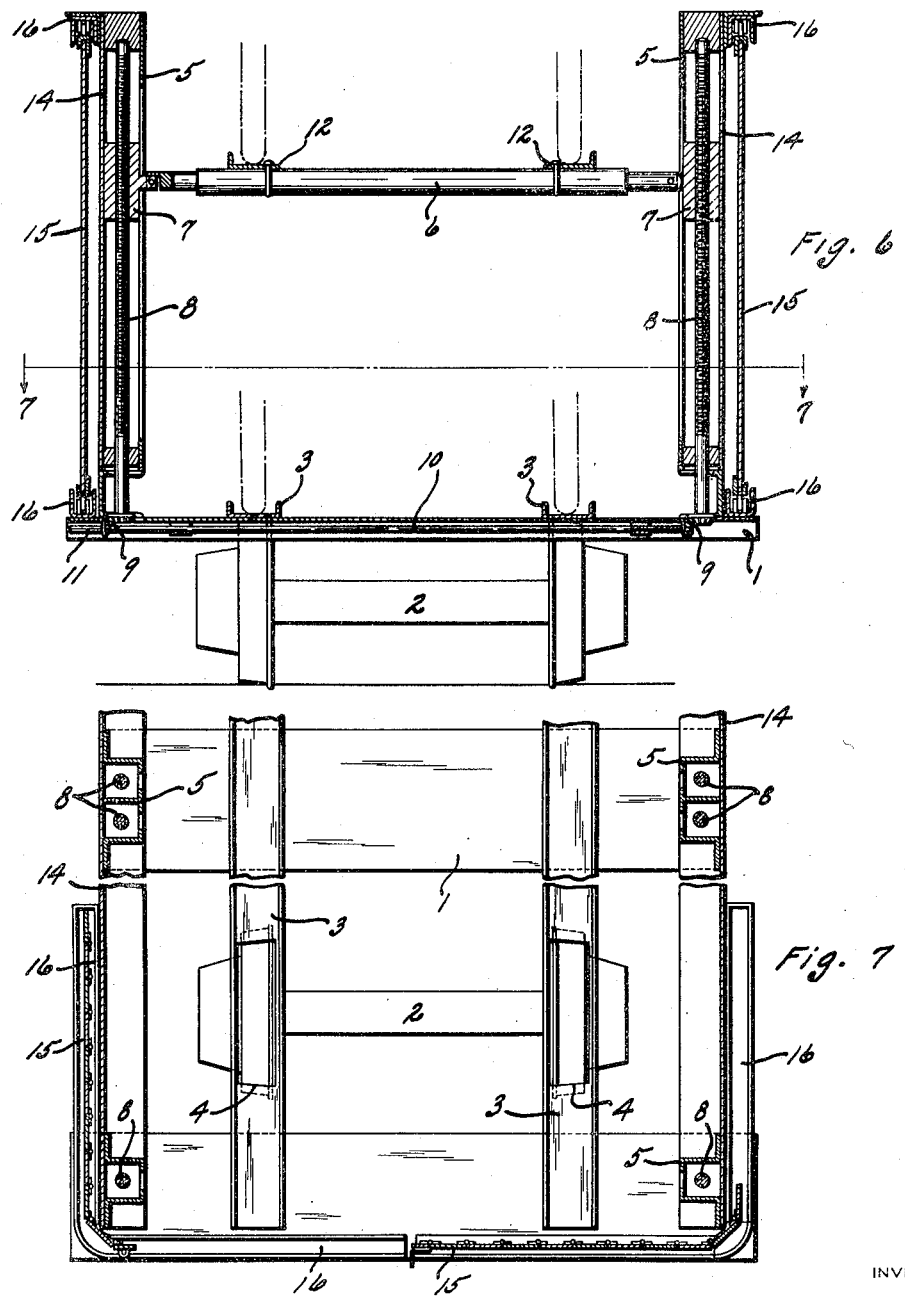

Patented Jan. 17, 1933

1,894,534

UNITED STATES PATENT OFFICE

DAVID J. DOLAN, OF CLEVELAND HEIGHTS, OHIO

AUTOMOBILE RAILWAY CAR

Application filed October 9, 1931. Serial No. 567,861.

This invention relates to railroad cars for transporting vehicles, particularly automobiles, and the objects are to provide a car which shall have a capacity for the maximum number of vehicles, within railroad clearance requirements, for transportation thereof at a minimum cost under prevailing tariff schedules.

To meet these conditions it is necessary that the vehicles be loaded one above another. Provision for this would be a simple matter were vehicles all of the same height and were it not for overhead clearances. But the maximum vehicle height to be considered is so great that two vehicles of maximum height would exceed the clearance limits if placed one above the other.

A further object of my invention is to provide for vehicle adjustment of the upper of a pair of vehicles, so that a high vehicle may be combined with a low vehicle either above or below, to form a pair whose combined height will not exceed the limit. At other times it may be desirable to combine two vehicles of medium height and this also is made possible by the adjustment of the upper vehicle.

It will be apparent that the problem of overhead clearance is one that present many difficulties. Every inch of vertical dimension must be carefully conserved, and the car body must therefore be lower than is the usual practice. It has been found most economical to build the car of length to receive three vehicles end to end. The car body is supported on the usual trucks located near its ends. According to my invention and as a further object thereof I take advantage of this arrangement to lower that portion of the body intermediate the trucks so that the ways provided therein for the lower stretch of vehicles are in effect in three sections each of vehicle length, the end sections being over the trucks and the intermediate section between the trucks and lower than the end sections. By this arrangement the central part of the car may be occupied by two vehicles of greater aggregate height than will be accommodated by the end sections.

Where this is done it becomes advisable to provide that the ways which support the upper three vehicles be separated into sections corresponding to the sections of the lower ways, with each upper section vertically adjustable independent of the others. And since in loading and unloading, vehicles must be run from one section to another, as a further object of my invention I provide that each section of the upper way be arranged for independent adjustment of its ends to various elevations. The car is obviously to be loaded and unloaded from its end. And this is conveniently accomplished by means of a portable ramp. The car should have a roof. In loading and unloading the upper level of the car, however, when the ramp is used, more overhead is needed beneath the roof than after the car is loaded. As still another object of my invention, therefore, I provide that the roof may be raised for loading and unloading the car.

The usual gauge for vehicle treads being the same as for railroads, the lower ways of the car pass directly over its wheels. That the level of these ways over the trucks may be as low as possible, I provide therein openings for clearing the upper extremities of the car wheels, these openings being, however, small enough so that the vehicle wheels may roll therepast upon the ways.

Figure 5:
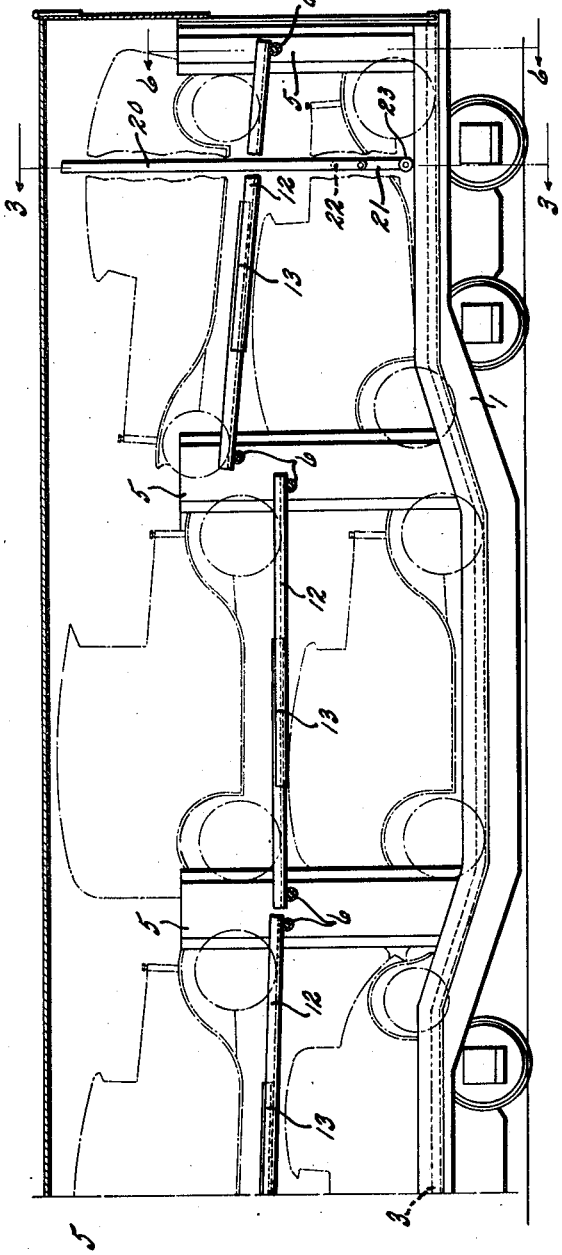

The exact nature of this invention together with further objects and advantages thereof will be apparent from the following description, taken in connection with the accompanying drawings which are more or less conventionalized showings and in which Fig. 1 is a side elevation of a car embodying the invention; Fig. 2 is an end elevation of the same partly broken away to show interior construction; Fig. 3 is a sectional elevation as in the plane of line 3—3, Fig. 5; Fig. 4 is a side elevation of a modified car, with the car side and top removed showing the car loaded and certain parts thereof broken away to show details of construction; Fig. 5 is a view corresponding to that of Fig. 4 but illustrating a car whose frame is dropped between its trucks, and which is consequently loaded differently; Fig. 6 is a detail in transverse section as in the plane of line 6—6, Fig. 5;

and Fig. 7 is a sectional detail as in the horizontal plane of line 7—7, Fig. 6.

With reference now to the drawings, 1 represents generally the lower, frame portion of the car body, which is elongated as shown and is arranged to be supported on a pair of double axle trucks 2 in the usual manner. The frame 1 may not be entirely covered by a platform as is usual, but carries a vehicle guiding and supporting trackway. As shown this way comprises a pair of rails in the form of channel irons 3 arranged with their flanges extending upwardly as indicated in Figs. 6 and 7, so that vehicle wheels will be maintained thereon as shown in broken lines Fig. 6.

Since the tread gauge of the vehicle is the same as that of the railroad the rails 3 extend over the wheels of the trucks 2. Therefore, that the rails may have the lowest elevation possible I provide openings 4 therein over the truck wheels for clearance therefrom when the car is in motion. Thus when a vehicle is being loaded as its wheels pass over the openings 4 they bear upon the car wheels; but as the wheel base of a vehicle is much longer than that of a car truck, the vehicle in loaded position over a car truck will always straddle the openings 4, as indicated Fig. 4.

As there shown the car is of such length that its rails 3 which constitute its lower trackway, will accommodate three vehicles end to end. That three more vehicles may be accommodated, one above each of the lower ones, I provide a second elevated way. This way may extend rigidly the length of the car as indicated at 12a Fig. 1, but that nesting of the pairs of vehicles thus formed may be approached so far as possible, I preferably arrange that the upper way be in three sections each vertically adjustable independently of the others, and its ends independent of each other.

For this purpose I mount columns 5 upon the frame 1 spaced along the sides thereof to define three horizontal rectangles. Between each laterally spaced pair of columns 5 I arrange a transverse member 6, and provide for its vertical adjustment by means preferably associated with the columns 5. As indicated in Fig. 6, this means may comprise the nuts 7 positioned upon screws 8 within the columns, the pair of screws being interassociated by gears 9 so that they can have simultaneous actuation by a shaft 10 as by a detachable handle engaging the squared end 11 of the shaft 10.

Between adjacent pairs of transverse members 6 I arrange a pair of rails 12 longitudinally extending above the rails 3 to form an upper section of vehicle trackway. The rails 12 are here shown as angle irons bolted to the member 6. As the ends of each section of the upper way are to be capable of independent adjustment, I make each rail section in two pieces bolted together for relative sliding movement as indicated at 13 so that each section is of extensive length to accommodate its tilting adjustment.

It is obvious that by the arrangement described, once three vehicles have been loaded onto the car upon the lower way, the sections of the upper way may be adjusted to form a continuous level way thereabove, three cars may be loaded upon this upper way, one upon each section thereof, and the sections may be thereafter independently lowered, each end of each section as low as permitted by the vehicle therebelow, and a minimum level thus be attained for the tops of the upper row of vehicles; unloading being accomplished in the reverse order of operations.

It is desirable that the car have sides, ends and roof.

Side panels 14 may be attached for support directly to the columns 5 as indicated in Fig. 7. At the ends of the car, sectional sliding doors 15 may be provided, arranged to move on trackways 16 between open position as indicated at the left side and closed position as indicated at the right of Fig. 7.

The roof may comprise a single member 17 extending the length of the car, and laterally overhanging each side 14 thereof. At its ends the roof may be provided with panels 18 overhanging the end doors 15, and supported as upon hinges 19 so that they can be raised and folded back over the roof to permit loading and unloading of the car. In the embodiment of Figs. 3 and 5 the roof is shown in the lowermost of two positions between which it is adjustable. The supporting means here shown, by which the roof adjustment is had comprises, near each end of the roof, and at each side thereof, a rod 20 having its lower end connected with an intermediate portion of the lever 21. One end of the lever 21 is pivotally mounted as at 22 and the other end provided with a handle 23. It will be apparent that raising the two handles 23 at one end of the car will raise the corresponding end of the roof 17, the handles being moved approximately 180° from the position shown to give the roof end its maximum elevation, after which the handles or the roof itself may be blocked or pinned up until after the loading or unloading operation is complete.

What I claim is:

1. In a railroad car for transporting vehicles, a body mounted upon a pair of spaced trucks, said body including a pair of vehicle ways one above the other, the lower way having a portion intermediate said trucks lower than its end portions, the upper way being arranged for adjustment to various elevations.

2. In a railroad car for transporting vehicles, a body mounted upon a pair of spaced trucks, said body including a pair of vehicle ways one above the other, the lower way having a portion intermediate said trucks lower than its end portions, and the upper way being arranged for independent adjustment of its ends to various elevations.

3. In a railroad car for transporting vehicles, a body mounted upon a pair of spaced trucks, said body including a pair of vehicle ways one above the other, the lower way having a portion intermediate said truck lower than its end portions, each of said three portions being of a length to carry a vehicle, and the upper way being arranged for adjustment to various elevations.

4. In a railroad car for transporting vehicles, a body mounted upon a pair of spaced trucks, said body including a pair of vehicle ways one above the other, the lower way having a portion intermediate said trucks lower than its end portions, each of said three portions being of a length to carry a vehicle, and the upper way being arranged for independent adjustment of its ends to various elevations.

5. In a railroad car for transporting vehicles, a body mounted upon a pair of spaced trucks, said body including a pair of vehicle ways one above the other, the lower way having a portion intermediate said trucks lower than its end portions, said upper way having sections each of a length to carry a vehicle and each arranged for adjustment to various elevations.

6. In a railroad car for transporting vehicles, a body mounted upon a pair of spaced trucks, said body including a pair of vehicle ways one above the other, the lower way having a portion intermediate said trucks lower than its end portions, each of said three portions being of a length to carry a vehicle, said upper way having sections each of a length to carry a vehicle, and each being arranged for independent adjustment of its ends to various elevations.

7. In a railroad car for transporting vehicles, a body mounted upon a pair of spaced trucks, said body including a pair of vehicle ways one above the other, the lower way having a portion intermediate said trucks lower than its end portions, the upper way having sections each of a length to carry a vehicle and each arranged for adjustment to various elevations, and said body having a roof arranged for vertical adjustment.

8. In a railroad car for transporting vehicles, a body mounted upon a pair of spaced trucks, said body including a pair of vehicle ways one above the other, the lower way having a portion intermediate said trucks lower than its end portions, the upper way having sections each of a length to carry a vehicle and each arranged for adjustment to various elevations, and said body having a roof arranged for independent adjustment of its ends to various elevations.

In testimony whereof I hereby affix my signature.

DAVID J. DOLAN.